Figure 1:
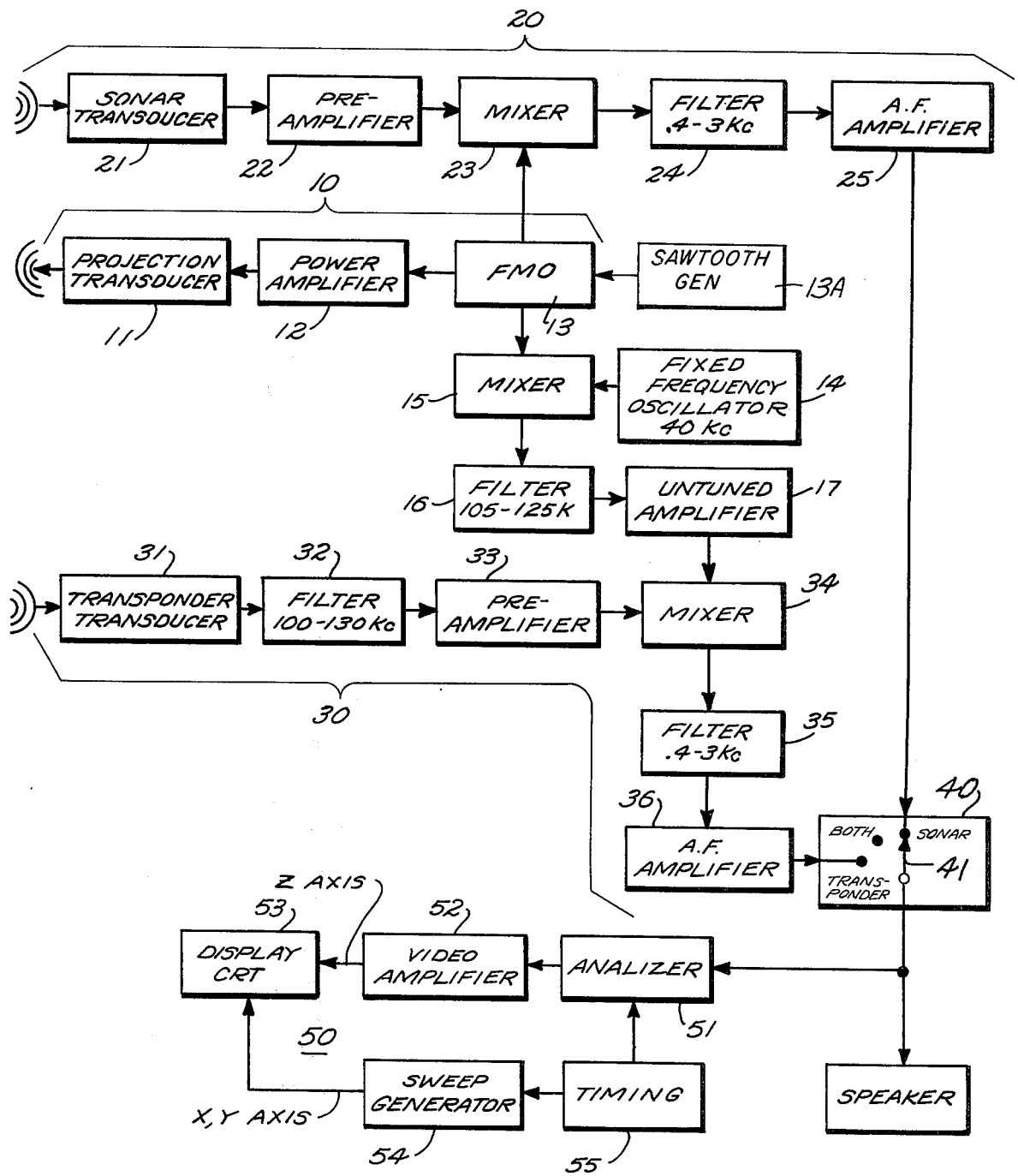

United States Patent [19]
Kelly et al.

[11] 3,939,463
[45] Feb. 17, 1976

[54] ACOUSTIC TRANSPONDER NAVIGATION SYSTEM

[75] Inventors: Neil C. Kelly; Robert L. McFarland, both of San Diego; Jack W. Sampsell, National City, all of Calif.

[73] Assignee: The United States of America as represented by the Secretary of the Navy, Washington, D.C.

[22] Filed: Feb. 5, 1964

[21] Appl. No.: 342,833

[52] U.S. Cl. .............................. 340/3 E; 340/3 FM
[51] Int. Cl.² ........................................... G01S 9/68
[58] Field of Search ......... 340/2, 3, 3 E, 3 FM, 5 D; 343/6.8, 14

[56] References Cited
UNITED STATES PATENTS

| | | | |
|---|---|---|---|
| 2,301,929 | 11/1942 | Budenbom | 343/14 |
| 2,421,394 | 6/1947 | Schelleng | 343/14 |
| 2,528,119 | 10/1950 | Crosby | 343/14 |
| 2,724,817 | 11/1955 | Hisserich | 340/3 |
| 2,977,568 | 3/1961 | Roshon, Jr. et al. | 340/3 |
| 3,164,659 | 1/1965 | Abrams | 340/5 X |
| 3,171,094 | 2/1965 | Geren et al. | 340/2 |

*Primary Examiner*—Richard A. Farley
*Attorney, Agent, or Firm*—R. S. Sciascia; G. J. Rubens; T. M. Phillips

EXEMPLARY CLAIM

1. In combination in an acoustic obstacle detection and navigating system;
a transmitting station comprising a variable frequency oscillator, a sawtooth generator coupled to said oscillator for sweeping the frequency of oscillations through the range of frequencies from $f_1$ to $f_2$, a submersible projection transducer coupled to said oscillator for continuously ensonifying a sector of water about said transducer with sonic energy varying between $f_1$ and $f_2$,
a fixed frequency oscillator of frequency $f_3$ at said station,
a sonar receiver at said station including a mixer for combining the frequencies $f_1$ to $f_2$ of said oscillator with the echo frequencies reflected from a passive target, so that the difference at any instant between the reflected frequency and the transmitted frequency is a frequency proportional to the rate of change of said variable frequency and target range,
a remote transponder station including a receiving hydrophone coupled to a transmitting transducer, a mixer coupled between said hydrophone and transmitting transducer, a local oscillator of fixed frequency, $f_3$, coupled to said mixer for shifting received frequencies from the range of $f_1$ to $f_2$, to the range of $f_1 + f_3$ to $f_2 + f_3$, and
a second receiver at said transmitting station including a mixer for combining signals repeated from said remote transponder with the frequencies, $f_1$ to $f_2$ of said variable oscillator displaced by the frequency $f_3$, of said fixed frequency oscillator, and a common display for both mentioned receivers.

1 Claim, 5 Drawing Figures

INVENTORS
NEIL C. KELLY
ROBERT L. McFARLAND
BY JACK W. SAMPSELL
ATTORNEYS

ACOUSTIC TRANSPONDER NAVIGATION SYSTEM

The invention described herein may be manufactured and used by or for the Government of the United States of America for governmental purposes without the payment of any royalties thereon or therefor.

This invention relates to a system for the detection of and navigation among obstacles and is particularly directed to the combination of a ship-carried echo system and bottom anchored transponders for beacons which are responsive to sonar signals.

While peaceful uses of the system of this invention are comtemplated, the military aspects thereof will be referred to here. In offensive naval operations in minable waters, as in narrow channels or harbor entrances, it is necessary not only to search out a safe course through hidden shoals and hidden explosive mines, but to mark the course so that it can thereafter be easily and rapidly retraced. Similar problems are presented in plotting a navigable course under the polar ice cap.

The general object of this invention is to provide an improved system for detecting hidden submarine obstacles and for marking a navigable course through such obstacles.

A more specific object of this invenion is to provide an improved sonar system which will respond to both echo signals from passive hunted submerged objects as well as signals from underwater transponders and simultaneously display both signals on a common display screen.

In the evolvement of the sonar system of this invention it was first recognized that the ship-to-target ranges to be measured were often much too short to be measured accurately with the conventional bursts of high power, high frequency sonic energy.

To attain the objects of this invention a continuously transmitted frequency modulated signal is employed. The system comprises a shipborne transmitter-receiver station and one or more transponders which are anchored to the bottom and, like beacons, will respond to interrogations from the ship station. The ship station comprises a transmitter with a variable frequency oscillator and a sawtooth generator coupled to the oscillator for sweeping the frequency of oscillations through a range of frequencies from $F_1$ to $F_2$ and repeating the sweep at the repetition rate of the sawtooth wave. Such frequency modulated waves are applied after power amplification to a projection transducer for ensonifying a predetermined horizontal sector of water about the carrying ship.

The shipborne station also includes two sonic receivers. One receiver includes a mixer for combining the frequency modulated signal of the transmitter with the echo signal received from any passive object which is large enough to reflect energy of the ensonified environment. Since the projected energy is continuously and preferably linearly sweeping in frequency the combined output product of the mixer then contains a frequency component which is a function of the round trip travel time of the FM wave. That is, the mixer product is a function of range which, after proper amplification, may be applied directly to the Z-axis of a display screen for indicating the range of the reflecting object.

The shipborne station includes a second receiver including a mixer for mixing reflected signals with the locally generated frequency $F_1$ to $F_2$ of the frequency modulated local oscillator, this $F_1 + F_2$ frequency being displaced by a third frequency $F_3$. Frequency $F_3$ corresponds to a crystal controlled frequency of the transponder station remotely located. The output of the mixer at the shipborne station is also a function of the range of the transponder from the ship. Consequently, the output product of both mixers at the shipborne station may be displayed on the same display screen, and according to this invention are both displayed on the screen simultaneously or separately, under the control of the operator.

The transponder comprises a hydrophone transducer coupled to a projector transducer through a mixer. Into the mixer is injected the output of a crystal controlled oscillator, set at frequency $F_3$. The local oscillator $F_3$ is at a sufficiently high frequency such that the projected frequency is far enough from the frequency of the received energy of the transponder to effectively prevent ringing within the transducer circuits. Filters of high quality are used in the circuit before and after the mixer stage to increase the isolation between the input and output frequencies of the transponder.

According to an additional feature of this invention novel analyzer means are provided at the ship's station for efficiently converting the frequency information in the mixer products of either receiver into meaningful range information.

Figure 2:
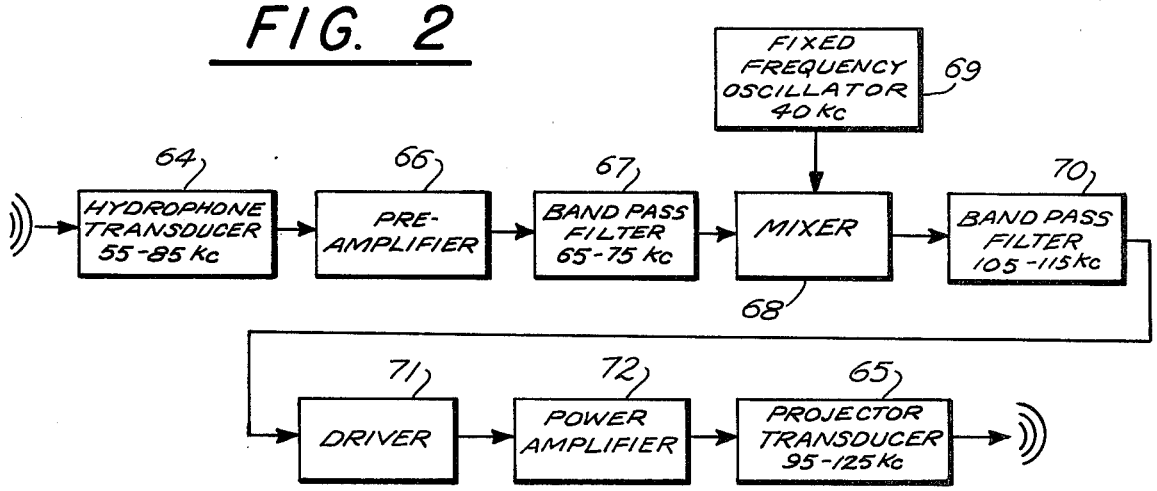
Figure 3:
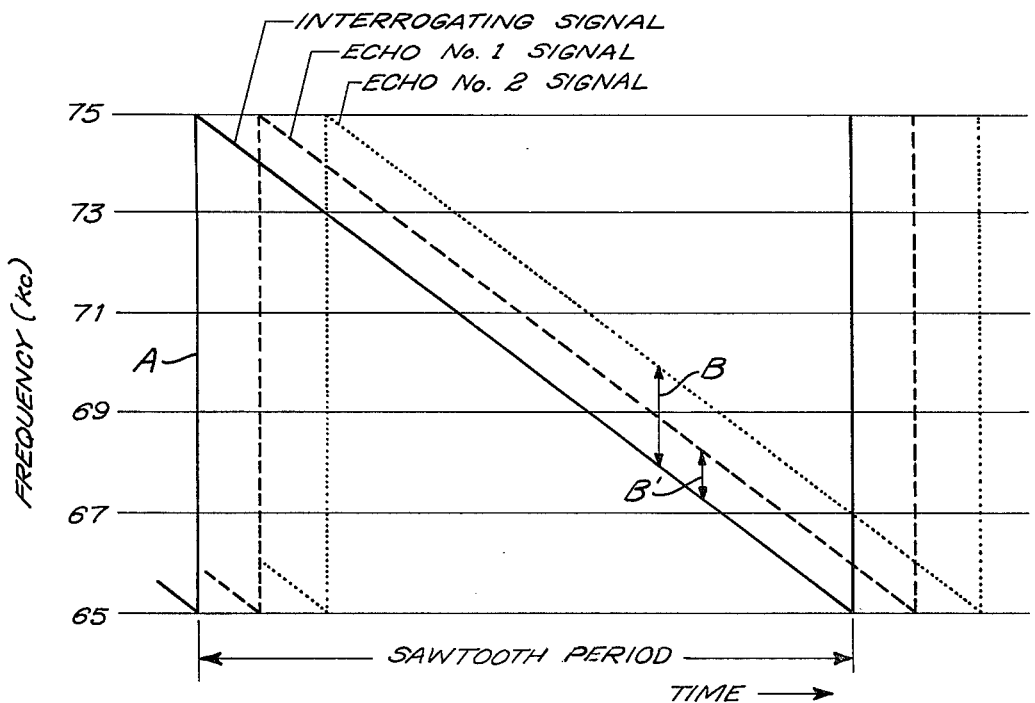
Figure 4:
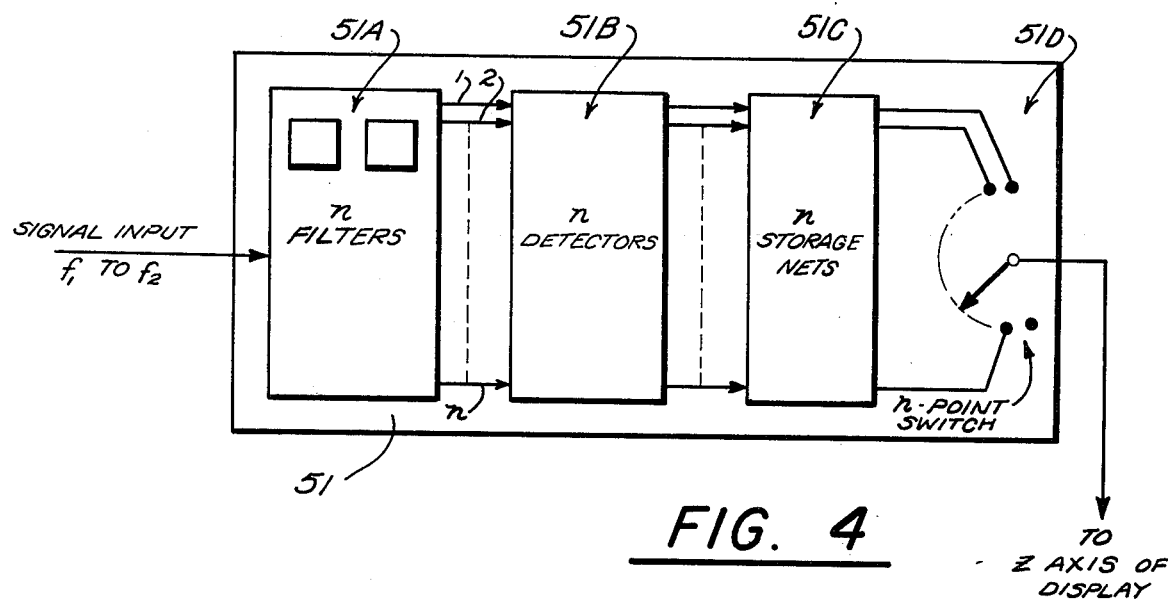
Figure 5:
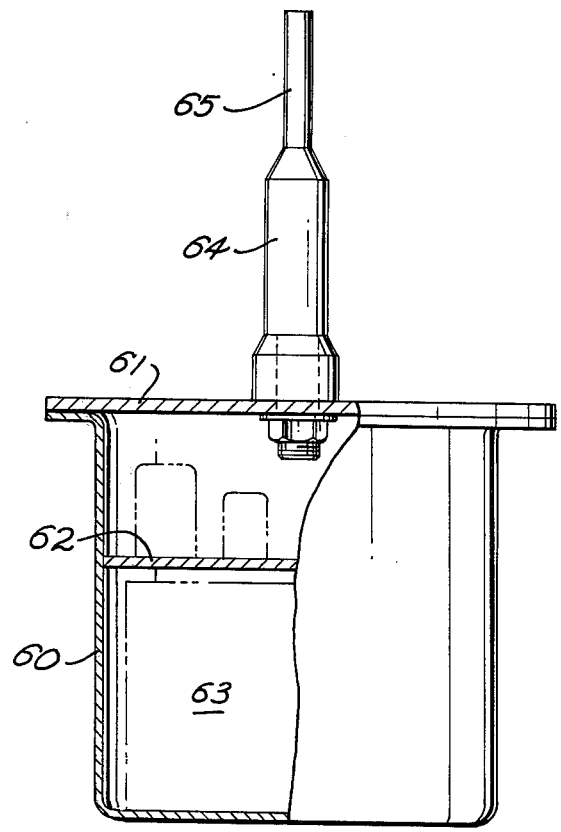

Other objects and features of this invention will become apparent to those skilled in this art by referring to the specific embodiment described in the following specification and shown in the accompanying drawing in which:

FIG. 1 is a block diagram of the shipborne station including a sonic transmitter and two receivers, FIG. 2 is a block diagram of a transponder of the type which cooperates effectively with the transmitter-receiver of the ship's station of FIG. 1, FIG. 3 is a time-frequency diagram of the frequencies employed in the transmitting and receiving channels of the system of this invention, FIG. 4 is a block diagram of a frequency-to-range analyzer of the type which may be employed in the ship's station of FIG. 1, and FIG. 5 is a quarter sectional view of the preferred physical embodiment of the transponder of this invention.

The station shown in block diagram in FIG. 1 will normally be shipboard mounted while the transponder shown in block diagram in FIG. 2 will, in operation, be floated on or near the bottom of the ocean. The ship's station comprises the sonar transmitter 10 and two sonar receivers shown, respectively, at 20 and 30. Receiver 20 will be termed the sonar receiver while receiver 30 will be termed the transponder receiver. The operator controlled switch 40 will permit the audio output of either receiver or both receivers simultaneously to be applied to the display 50. As will appear, the mine detecting and mine field navigating functions of the carrying ship require separate analysis of the two receiver outputs as well as comparison of the two outputs at one time.

Details of construction of the projection transducer 11 are not important to this invention, the only requirement being that considerable power can be radiated into the water environment about the ship and that the direction of propagation can be determined. A training motor, not shown, preferably continuously rotates the directional beam. The power amplifier 12 energizes the transducer and is, in turn, driven by the oscillator 13.

The frequency of oscillation of oscillator 13 is not fixed but instead is driven by a sawtooth wave from sawtooth generator 13A so that the frequency of the oscillator changes linearly with time so that the frequency of oscillation moves gradually between two predetermined frequency limits and then abruptly starts over. The fly-back time of the sawtooth modulated oscillator is blanked from the output of the transducer. The oscillator 13 may, for example, vary between 75 kilocycles per second and 65 kilocycles per second as shown in FIG. 3, where the sawtooth trace A has a sawtooth period determined by the modulator of the oscillator 13.

In operation the transmitted sawtooth wave is reflected back from any reflecting object and is received by the sonar transducer 21 of sonar receiver 20. After amplification in amplifier 22 the received echo signals are combined with the transmitted frequencies in mixer 23. It will now become apparent that, since the velocity of propagation of the ensonified waves through the water is finite, there is a definite relationship between the distance traveled by the wave and the difference between the frequency of the wave at the instant it is transmitted outwardly and the same instant the wave is received from the echo. On the time-frequency diagram of FIG. 3 it is apparent that the distance the wave has traveled from the projection transducer out to a reflecting object and back to the sonar transducer becomes a function of the difference frequency which in FIG. 3 is the frequency difference B. For reflecting objects of less distance, the transient time is less. For echo number 1, for example, the frequency difference B' will be analagous to the range of that echo object.

Conveniently, this frequency difference is obtained in mixer 23, FIG. 1, which combines the transmitted frequency from oscillator 13 with the received frequency at the output of the receiver pre-amplifier 22. Since the frequency difference found by mixer 23 may vary down to 0 for 0 range, the output of the mixer is passed through the broad lowpass filter 24. The cut-off for the filter is determined only by the range and maximum frequency difference that will be encountered in the system. Where the transmitted frequencies are in the range suggested in FIG. 3, that is below 100 kilocycles per second, the difference frequency is normally in the audio range and the output of the audio amplifier 25 will be clearly audible tones, the higher the tone the greater being the distance of the reflecting object.

The output of the sonar receiver 20 is connected through switch armature 41 to the input of the analyzer 51 where the specific frequency of the tone is determined, is amplified by amplifier 52 and applied to the control grid, or Z-axis, of the display cathode ray tube 53. By employing a sweep from sweep generator 54, through a sine-cosine potentiometer, driven by the transducer training motor, a conventional position indicator (PPI) display is obtained. A PPI is ideally suited for presenting and displaying the range and direction information of the sonar signals of this invention. The timing device 55 synchronizes the display circuits.

One analyzer, 51, for converting frequency information to range is shown in FIG. 4. Thirty equal-width bandpass filters 51A, about 50 cps wide, are tuned to adjacent bands to cover the entire frequency range passed by filters 24 or 35. Each filter output is detected at 51B, is momentarily stored at 51C, and applied to switch contacts 51D. The contacts are rapidly sampled in synchronism with the PPI radial trace.

The second receiver 30 is similar in all important respects to the first receiver 20. Transducer 31, which is highly directional, is connected into the bandpass filter 32 the output of which, in turn, is coupled through the preamplifier 33 into mixer 34. The output of mixer 34 is connected through the lowpass filter 35 which has the same broad pass characteristics as filter 24 of receiver 20. The low frequency amplifier 36 is connected to the "transponder" terminal of switch 40 so that armature 41 can select the output of receiver 30 to the exclusion of the other receiver.

Receiver 30 differs from receiver 20 in the matter of the injection frequency to the mixer 34. The sawtooth variable frequency of the local oscillator 13 is displaced a fixed amount by the frequency of the fixed frequency oscillator 14. It may be noted here that the frequency of the fixed frequency oscillator 14 is identical to a local oscillator found in the transponder referred to below in connection with FIG. 2. The output of oscillator 14 is added algebraically in mixer 15 to the output of frequency modulated oscillator 13. In the example considered here the combined frequencies are added rather than subtracted. The upper side band of the mixer products of mixer 15 are selected, in the example considered, by the bandpass filter 16, which is, in turn, amplified by the untuned amplifier 17 before injection in the receiver mixer 34. As will appear after consideration of the transponder of FIG. 2 the two inputs to mixer 34 differ from the two inputs to mixer 23 but the differences are the same so that the product output of the two mixers is the same. This means then that the outputs of the two receivers may be displayed on the same cathode ray display tube. This means, in turn, that a transponder at the same range as a passive reflecting target will appear at the same range on the display tube.

One physical embodiment of the transponder is shown in FIG. 5 where the watertight sealed container 60 is a full-drawn stainless steel bucket closed at its upper end with the relatively thick plate 61. Inside the container is the insulating platform 62 which supports the various electrical components of FIG. 2. Beneath the platform are dry cells 63 for powering the transponder. The transducer stem extending vertically upward contains the receiving hydrophone 64 end to end and coaxial with the transmitting transducer 65. Both transducers are of the piezoelectric type and comprise, in one successful embodiment, coaxial cylinders of ceramic barium titanite with vacuum deposited silver on the interior and exterior surfaces of the piezoelectric cylinders. When connected to the transmitting circuits the ceramic vibrates in the radial mode so that energy is propagated from the exterior surfaces of the cylinders. When vibrated by a received acoustic wave, a voltage is developed which is taken from the silver and amplified in the receiver. The diameters of the cylinders determine the mechanical frequency of vibration of the crystal. The crystals are insulted one from another by suitable, rubber-like spacer-washers. Not shown are buoy attachment mechanisms for sinking the transducer container to or near to the bottom where it will stand in the vertical position of FIG. 5. A roll bar may be fixed over the antenna pedestal to prevent damage from drag chains of unfriendly craft.

The receiving hydrophone transducer 64 is coupled through the preamplifier 66 to the bandpass filters 67 for passing the band of frequencies received from the projector transducer 11 of the ship's station, FIG. 1. The output of the filter 67 is combined with the fixed frequency of oscillator 69 in mixer 68. It is significant that the frequency of oscillator 69 is identical to the fixed frequency oscillator 14 of the ship's station. The bandpass filter 70 selects the same sideband of mixer 68 as the filter 16 selects of mixer 15 of the ship's station. The selected sideband drives driver 71 and power amplifier 72 and energizes the projector transducer 65. It will be noted that there is no product detection in the transponder system of FIG. 2 but instead the frequencies received at transducer 64 are shifted in frequency in mixer 68 and are directly transmitted from transducer 65. It appears now since the frequency shift caused by oscillator 14, FIG. 1 and oscillator 69, FIG. 2 are the same, the product of mixer 34 at the ship's receiver is the same as the product of the unshifted link involving projector 11 and sonar receiver 20.

Many modifications may be made in the embodiment described above without departing from the scope of the invention defined in the appended claims. The specific frequencies mentioned for example, may be widely changed without altering the operation of the system.

What is claimed is:

1. In combination in an acoustic obstacle detection and navigating system;
   a transmitting station comprising a variable frequency oscillator, a sawtooth generator coupled to said oscillator for sweeping the frequency of oscillations through the range of frequencies from $f_1$ to $f_2$, a submersible projection transducer coupled to said oscillator for continuously ensonifying a sector of water about said transducer with sonic energy varying between $f_1$ and $f_2$,
   a fixed frequency oscillator of frequency $f_3$ at said station,
   a sonar receiver at said station including a mixer for combining the frequencies $f_1$ to $f_2$ of said oscillator with the echo frequencies reflected from a passive target, so that the difference at any instant between the reflected frequency and the transmitted frequency is a frequency proportional to the rate of change of said variable frequency and target range,
   a remote transponder station including a receiving hydrophone coupled to a transmitting transducer, a mixer coupled between said hydrophone and transmitting transducer, a local oscillator of fixed frequency, $f_3$, coupled to said mixer for shifting received frequencies from the range of $f_1$ to $f_2$, to the range of $f_1 + f_3$ to $f_2 + f_3$, and
   a second receiver at said transmitting station including a mixer for combining signals repeated from said remote transponder with the frequencies, $f_1$ to $f_2$ of said variable oscillator displaced by the frequency $f_3$, of said fixed frequency oscillator, and a common display for both mentioned receivers.

* * * * *